United States Patent [19]
Ladret et al.

[11] Patent Number: 5,525,587
[45] Date of Patent: Jun. 11, 1996

[54] APPLICATION OF MUDS CONTAINING SCLEROGLUCAN TO DRILLING LARGE DIAMETER WELLS

[75] Inventors: Alain Ladret, Saint-Gaudens; Alain Donche, Jurançon, both of France

[73] Assignee: Societe Nationale Elf Aquitaine, Courbevoie, France

[21] Appl. No.: 332,749

[22] Filed: Nov. 3, 1994

Related U.S. Application Data

[63] Continuation of Ser. No. 127,485, Sep. 28, 1993, abandoned, which is a continuation of Ser. No. 40,071, Mar. 30, 1993, abandoned, which is a continuation of Ser. No. 706,016, May 28, 1991, abandoned.

[30] Foreign Application Priority Data

May 28, 1990 [FR] France ................. 90 06575

[51] Int. Cl.$^6$ .............................................. C09K 7/02
[52] U.S. Cl. .............................................. 507/110
[58] Field of Search ................................... 507/110

[56] References Cited

U.S. PATENT DOCUMENTS

| | | | |
|---|---|---|---|
| 3,301,848 | 1/1967 | Halleck | 106/162 X |
| 4,125,167 | 11/1978 | Evans et al. | 175/65 |
| 4,219,087 | 8/1980 | Johnson | 175/65 |
| 4,299,710 | 11/1981 | Dupre et al. | 252/8.5 |
| 4,412,925 | 11/1983 | Ballerini et al. | 507/110 |
| 4,439,328 | 3/1984 | Moity | 252/8.5 |
| 4,473,124 | 9/1984 | Savins | 175/65 |
| 4,534,426 | 8/1985 | Hooper | 175/65 |
| 4,599,180 | 7/1986 | Vio et al. | 252/8.5 C X |
| 4,839,095 | 6/1989 | Lahalih et al. | 252/8.514 |
| 4,900,457 | 2/1990 | Clarke-Sturman et al. | 252/8.514 |
| 4,983,583 | 1/1991 | Ridoux | 252/8.513 X |
| 5,101,902 | 4/1992 | Parcevaux et al. | 507/110 |
| 5,330,015 | 7/1994 | Donche et al. | 507/110 |

OTHER PUBLICATIONS

*Principles of Drilling Fluid Control*, 12th ed., Petroleum Extension Service, The University of Texas at Austin, Sep., 1969, 74–76, 83–85, 122, 124–127.

*Composition and Properties of Drilling and Completion Fluids*, 5th ed., H. C. H. Darley and George R. Gray, Gulf Publishing Co., pp. 553–559, 563–581.

*Boues de Forage*, C. Garcia & P. Parigot, Institut Français du Pétrole, École National Supérieure du Pétrole et des Moteurs `a Combustion Interne, pp. 131–132.

*Drilling Fluids Ptimization*, James L. Lummus & J. J. Azar, PennWell Books, Tulsa, OK, 1986, pp. 109–113.

*Primary Examiner*—Philip Tucker
*Attorney, Agent, or Firm*—Birch, Stewart, Kolasch & Birch

[57] ABSTRACT

The present inventors found that the addition of scleroglucan, in particular of unrefined scleroglucan, to the water employed as drilling fluid for drilling wells requiring a high flow rate made it possible to limit formation leaching and improved the removal of cuttings.

The invention may be applied to drilling of large-diameter wells.

12 Claims, 1 Drawing Sheet

APPLICATION OF MUDS CONTAINING SCLEROGLUCAN TO DRILLING LARGE DIAMETER WELLS

This application is a continuation of application Ser. No. 08/127,485, filed on Sep. 28, 1993 now abandoned, which is a Rule 62 Continuation of Ser. No. 08/040,071, filed on Mar. 30, 1993 now abandoned, which is a Rule 62 Continuation of Ser. No. 07/706,016, filed on May 28, 1991, now abandoned.

FIELD OF THE INVENTION

The present invention relates to the application of a mud containing scleroglucan to drillings using a high mud flow rate, and in particular to drillings of a large diameter, equal to or greater than 30 cm.

BACKGROUND OF THE INVENTION

Drilling mud is a more or less complex mixture of a base liquid, water or oil, and of various products, which is employed for drilling wells. This mud, injected into the string of drill pipes, moves upwards in the annular space between the walls of the drilled geological formations and the pipe string. One function of the mud is to ensure the continuous removal of the cuttings torn away at the cutting face to prevent the tool from balling up. The cuttings must be conveyed towards the surface in the annular drilling space and must be removed at the surface. To achieve this, the mud must be sufficiently viscous and its bearing capacity must be such that the cuttings can stay in suspension in the mud when the flow rate of the latter is zero. Another of the many functions of the mud is to support the wall of the well so that there are no falls. This function is normally ensured by virtue of the deposition on the walls of a film consisting of the clayey particles present in the mud. Any damage to the walls of the well must be avoided as mach as possible. Other conventional functions of the mud which can also be mentioned are corrosion-free cooling and lubrication of the drilling tool, balancing the pressure in the formation pores, controlling filtration in the formation, etc.

Under normal drilling conditions, when the drilling is sufficiently advanced and when the drilling diameter is smaller than or equal to 30 cm, the physical and physicochemical properties of the mud are strictly controlled and these properties are maintained or are adapted to the drilling conditions by virtue of the addition of various products such as viscosity improvers, weighting materials, filtration reducers, mud thinners (and the like) as various and numerous constituents of the mud.

To fulfil its many functions, the mud must exhibit certain physical and physicochemical characteristics which are adapted to the problems which are encountered and which vary as a function not only of the nature of the terrain encountered but also of the state of progress of the drilling and of the drilling technique employed, and which may be conflicting.

For example, drilling large-diameter wells presents highly specific problems precisely because of their great volume and of the nature of the terrains which are traversed and which are frequently poorly consolidated. These large-diameter drillings are performed in the initial stage of drilling, in order to cross the first 300 to 1500 meters of formation. In drilling of this type priority is generally given to cleaning the hole and to the suspension qualities of the mud. In fact, drilling of this type is characterised by a very large volume of the cuttings to be removed, bearing in mind the surface of the walls, the nature of the terrain and the rate of progress, which is frequently high. The volumes of mud used for drilling large-diameter wells are considerable. To give an example, in the case of a 90-cm diameter well the volume of the drilling hole is of the order of 800 liters per linear meter and the pumps deliver 4,000 to 4,500 liters per minute. The muds employed must therefore be capable of being prepared very quickly and in large quantities.

The drilling of large-diameter wells requiring a high fluid flow rate is usually performed with water by itself, and the insufficiency of the viscosity thereof being compensated by an increase in the pumping rate.

While this technique offers an obvious economic advantage, for example in the case of drilling at sea, its disadvantage is that it results in considerable leaching of the walls. In addition, when such a drilling fluid consisting only of water is employed, it frequently happens that when the movement of the fluid in the well stops, as can happen in the course of drilling, the drilled cuttings settle again at the bottom of the well and result in the drilling tool balling up when drilling recommences.

To increase the bearing capacity of the drilling mud a certain quantity of a reactive clay such as bentonite is sometimes added to the water employed for high flow rate drillings. The use of such a product added to the drilling water is limited, however, because, on the one hand, it greatly increases the cost of drilling, bearing in mind the mud volumes used and the quantities of product which are necessary, of the order of 80 kilograms per cubic meter, and, on the other hand, it requires some hundreds of tons of product to be stored at the drilling site.

SUMMARY OF THE INVENTION

It has now been found that the addition to the water employed for drilling wells using a high flow rate of mud having a low concentration of a biopolymer called scleroglucan, known as a viscosity improver which can be employed over wide ranges of temperature, salinity and pH, and which has preferably not been refined, makes it possible to improve considerably the performance of the water drilling, as well as the quality of the hole, at a modest cost and with simplicity in use.

DETAILED DESCRIPTION OF THE INVENTION

The subject of the invention is the application of a mud composed of a useful quantity of preferably unrefined scleroglucan in dilution in a base water of any kind to drillings at high flow rates and in particular to the drilling of surface formations and/or the drilling of wells of large diameter, in particular greater than 30 cm. The base water employed for the mud in the application according to the invention may be fresh water, seawater, brine or any other type of water, for example hard water containing limestone or magnesium. The useful quantity of scleroglucan needed to obtain mud for the application according to the invention is between 2 and 20 kg/m$^3$ of final solution. The useful quantity of unrefined scleroglucan which is needed to obtain the mud employed in the application according to the invention is preferably between 4 and 10 kilograms per cubic meter of final solution.

The scleroglucans which form part of the composition of the muds in the applications according to the invention are nonionic water-soluble homopolysaccharides with molecular weights in excess of 500,000, whose molecules consist of a linear main chain made up of D-glucose units linked by β 1,3 bonds and in which one out of three is linked to a lateral D-glucose unit by a β 1,3 bond. These polysaccharides are obtained by fermentation of a medium based on sugar and of inorganic salts under the effect of a microorganism of a Sclerotium type. A more complete description of scleroglucans and of their preparation can be found in U.S. Pat. No. 3,301,848, whose content is incorporated by reference in the present description.

As source of scleroglucan it is possible, for example, according to the invention, to resort to the scleroglucan isolated from the fermentation medium, the product being in the form of powder or else of a more or less concentrated solution in an aqueous and/or hydroalcoholic solvent, or else to employ the liquid reaction medium resulting from the fermentation and containing scleroglucan in solution.

The scleroglucan forming part of the composition of the mud employed in the application according to the invention contains all or part of the mycelium of the producing fungus.

The use of a mud composed of a limited quantity of scleroglucan, preferably unrefined, diluted in water for drilling wells with a high flow rate makes it possible, at limited cost and storage requirements, to increase considerably the bearing capacity of the mud and hence the tendency of the cuttings to remain in suspension, with the result that balling up is avoided and that an effective cleaning of the well is ensured, together with good pump efficiency. Another advantage of the use of such a mud in the application according to the invention is that it reduces the leaching effects and ensures that the walls are kept and conserved much better than when drilling with water (pure or with a reactive clay).

The advantages of a mud composed of a useful quantity of scleroglucan diluted in a base water of any kind and its advantage for the application according to the invention are illustrated by the following examples, given without any limitation being implied, starting with complex muds which are not especially intended for the application according to the invention.

The hardware employed for the measurements is standardised (API Committee RP 13 standards). The viscosity of the tested solutions was measured with the aid of a Fann viscometer with six speeds, namely 600, 300, 200, 100, 50 and 30 revolutions per minute, each corresponding to a rate gradient, expressed in $s^{-1}$, of 1020, 510, 340, 170, 85 and 51 $s^{-1}$ respectively. The Fann viscometer yields a measure of shear stress, known as a Fann reading, expressed in this case in pascals (Pa). The Fann viscometer is an apparatus with coaxial cylinders whose rotor is driven by an electrical motor. The shear resistance of the mud contained in a beaker in which the coaxial cylinders are immersed is measured. The shear resistance is read off on a graduated dial at different speeds of rotation of the rotor. The viscosity of the mud causes a rotation of the stator, which is shown on the reading dial.

The filtration measurements are carried out after thirty minutes with the aid of an API filter press and are expressed in milliliters.

The scleroglucan employed is manufactured by Sanofi Bio Industries from a strain of Sclerotium rolfsii. An unrefined grade was employed, containing in the order of 25% of mycelium residues, marketed under the name of Actigum CS6.

The rheological characteristics are shown by the viscosity data, expressed in pascal seconds (Pa s), but also as values known as "gels" of an apparent viscosity AV, of a plastic viscosity PV and of a yield value YV commonly used by drilling mud experts. The "gel 0" and "gel 10" values, measured with the Fann viscometer, make it possible to assess the thixotropy of the mud, that is to say its ability to gel when the fluid is stationary. This pseudoplastic property is characterised by a flow threshold below which the fluid remains stationary, and a more or less rapid decrease in viscosity as soon as flow takes place.

To obtain the gel values the operating method is as follows: the rotor of the viscometer is rotated at 600 rev/min for 30 s and the motor is then stopped. After waiting for 10 s the motor is set to rotate at 3 rev/min. The maximum deflection which is read constitutes the initial gel or "gel 0". The mud is then allowed to stand for 10 min and the rotor is set in rotation again at 3 rev/min. The maximum number read constitutes the "gel 10".

To obtain the apparent viscosity of the mud in centipoises, the reading at 600 rev/min is divided by two. The calculation of plastic viscosity, in centipoises, is performed by taking the difference between the Fann reading at 600 rev/min and the Fann reading at 300 rev/min. The yield value is obtained by taking the difference between the apparent viscosity and the plastic viscosity, and multiplying this difference by two. The yield value expresses the minimum tension below which there is no flow in the case of laminar flow regimes.

EXAMPLE 1

The Fann viscometer was used to compare the rheological behavior and the thixotropy of a mud containing scleroglucan and of a mud containing bentonite, to both of which a clayey filler (natural clay known as nonreactive FGN) was added as a contaminant.

The composition of the muds is given below:

| - mud containing scleroglucan: | |
|---|---|
| water | 1.5 l |
| soda (NaOH) | up to pH 10 |
| CS6 | 12 g |
| FGN | 75 g |
| - mud containing bentonite: | |
| water | 2 l |
| soda (NaOH) | 2 g |
| bentonite (FB2) | 120 g |
| FGN | 100 g |
| viscosity improver (Dispral Regular) | 3 g |

The curves in FIG. 1 enable the Fann readings of these two muds to be compared.

The mud containing scleroglucan is characterised by very pronounced pseudoplastic rheological properties and in particular by a high flow threshold.

The table below gives the gel values for the mud containing scleroglucan at various times.

| Time | 0 min | 10 min | 30 min | 1 h | 2 h | 5 h | 8 h | 18 h | 24 h | 48 h | 72 h |
|---|---|---|---|---|---|---|---|---|---|---|---|
| gel$_{Pa}$ | 11.5 | 15.8 | 15.3 | 16.3 | 16.3 | 18.2 | 17.7 | 18.2 | 19.1 | 22 | 4.3 |

These gels have stable and high values. The abrupt drop observed at 72 hours is due to the destruction of the product by fermentation; the addition of a bactericide to the mud suffices to get rid of this phenomenon.

It is also found that the gels are flat, that is to say that the difference from one gel to another is small and that this difference changes only very little even in the case of long times of the order of 48 h, in contrast to a mud containing only bentonite. The energy needed for setting such a mud back in motion is therefore practically independent of the time for which pumping is stopped.

The results show the remarkable ability of the muds containing scleroglucan to gel when the fluid is stationary. This gelling disappears very rapidly as soon as flow takes place. This phenomenon is completely reversible in the case of scleroglucan and shows the ability of such a mud to hold the drilled or weighting solids in suspension during stoppages of movement in the well and to revert immediately to motion when pumping is restarted, without giving rise to any potentially detrimental high overpressures in the well. As an example, the addition of 0.4% by weight of scleroglucan makes it possible to stabilize a suspension of solids in water.

EXAMPLE 2

The behavior of reactive clay tablets was compared with a worksite mud and a mud containing scleroglucan.

The compositions of the muds are given below, per liter of fresh water:

| - worksite mud: | |
|---|---|
| fresh water | 1 l |
| soda | up to pH 9.6 |
| bentonite | 30 g |
| Antisol 3000 O | 3 g |
| Antisol 100 | 1 g |
| CMC | 2 g |
| - mud containing scleroglucan | |
| fresh water | 1 l |
| soda | up to pH 9.8 |
| bentonite | 20 g |
| CS6 | 4 g |
| FGN | 60 g |
| CaCO$_3$ | 20 g |

The composition of the mud containing scleroglucan was defined so as to obtain physical and chemical characteristics resembling the worksite mud.

Antisol 30000 and Antisol 100 are PAC (polyanionic cellulose) viscosity improvers of high and low viscosity respectively. CMC 110 is a carboxymethyl cellulose employed as filtrate reducer.

FGN and CaCO$_3$ were introduced into the mud containing scleroglucan to simulate the presence of solids originating from the terrain in a quantity of the order of 5% to 7% by volume.

The characteristics of these muds are given in the table below:

| | Worksite mud | Mud with CS6 |
|---|---|---|
| Relative density | 1.09 | 1.07 |
| MV | 53 | |
| Salinity | 1 g/l | |
| pH | 9.6 | 9.8 |
| Solids | 8% | |
| Filtrate | 9.6 | 9.7 |
| Fann 600 | 25.8 Pa | 21 Pa |
| Fann 300 | 16.3 - | 14.8 - |
| Fann 200 | 12.4 - | 12.4 - |
| Fann 100 | 7.6 - | 9.6 - |
| Fann 60 | 5.3 - | 8.6 - |
| Fann 30 | 3.8 - | 6.7 - |
| Gel 0 | 1.4 - | 5.7 - |
| Gel 10 | 2.9 - | 12.9 - |
| AV Pa s | $27 \times 10^{-3}$ | $22 \times 10^{-3}$ |
| PV Pa s | $20 \times 10^{-3}$ | $13 \times 10^{-3}$ |
| YV Pa | 6.7 | 8.6 |

It is found that the gel 0 obtained for the mud containing CS6 is much higher than the gel 0 obtained for the worksite mud. A high value for gel 0 indicates a high shear threshold. The relative difference between the gel 0 and the gel 10 may be linked with the ability of the mud to gel rapidly and hence to keep the solids in suspension immediately without settling.

The existence of such a flow threshold in the case of such a mud containing scleroglucan results in the property of moving in a tube like a plug, with a very low energy absorption. The drilling efficiency is found to be improved thereby.

Figure 1:
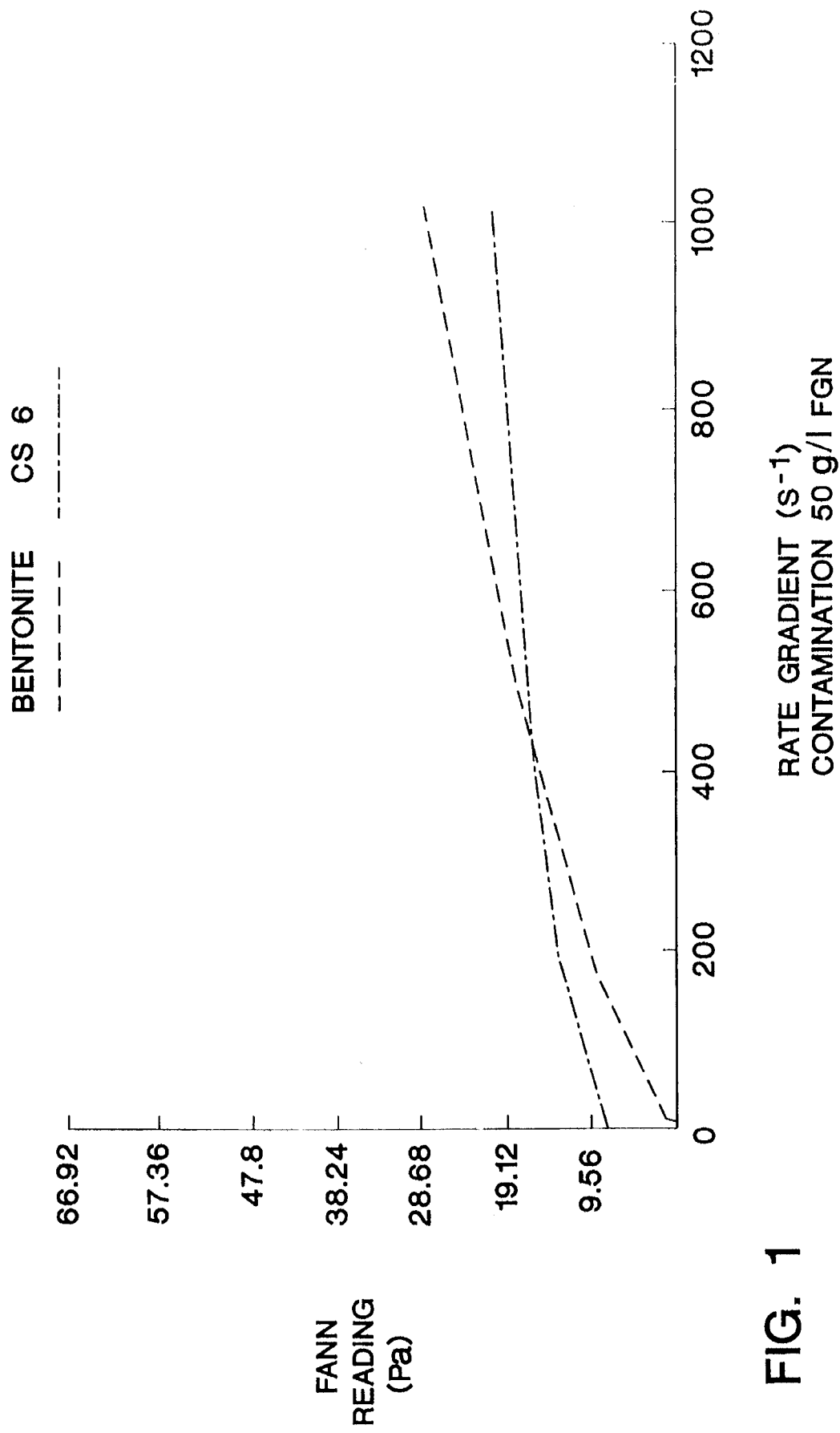
FIG. 1 compares the rheological behavior of a mud containing bentonite with a mud containing scleroglucan.

We claim:
1. A process of drilling wells which comprises drilling a well having an initial diameter greater than or equal to 30 cm; and applying to the well during an initial stage of drilling within the range of from the surface down to 1500 meters a fluid that comprises water and scleroglucan.
2. The process of drilling wells according to claim 1, wherein said composition further comprises a bactericide.
3. The process of drilling wells according to claim 1, wherein said composition comprises 2–20 kg/m³ of scleroglucan.
4. The process of drilling wells according to claim 1, wherein said scleroglucan is unrefined.
5. The process of drilling wells according to claim 1, wherein said composition comprises 4–10 kg/m³ of scleroglucan.
6. The process of drilling wells according to claim 1, wherein said scleroglucan is a nonionic water-soluble homopolysaccharide with a molecular weight in excess of 500,000.
7. The process of drilling wells according to claim 6, wherein said scleroglucan contains a linear main chain of D-glucose units linked by beta 1,3 bonds and in which one out of three is linked to a lateral D-glucose unit by a beta 1,3 bond.

8. The process of drilling wells requiring according to claim 1, wherein said scleroglucan is produced by carrying out fermentation of a producing fungus and wherein said aqueous composition further comprises at least part of the mycelium of said producing fungus.

9. The process of drilling wells rate according to claim 1, wherein said scleroglucan is present in an amount effective for gelling when said composition is stationary.

10. A process for drilling wells which comprises applying an aqueous composition to the drill, wherein said aqueous composition consists essentially of water and from 4 to 10 Kg of unrefined scleroglucan per 1 $m^3$ of said composition, and wherein the drilling is carried out where the well is at least 30 cm in diameter and within the range of the surface down to 1500 Meters.

11. The process of drilling wells according to claim 1, wherein said water is tap water or salt water.

12. The process of drilling wells according to claim 1, wherein said drilling is within the range of from the surface down to 300 meters.

* * * * *